United States Patent
Ferrigno

(10) Patent No.: US 9,047,299 B1
(45) Date of Patent: Jun. 2, 2015

(54) RECLAIMING BLOCKS FROM A DIRECTORY

(71) Applicant: EMC Corporation, Hopkinton, MA (US)

(72) Inventor: James P. Ferrigno, Marlton, NJ (US)

(73) Assignee: EMC Corporation, Hopkinton, MA (US)

( * ) Notice: Subject to any disclaimer, the term of this patent is extended or adjusted under 35 U.S.C. 154(b) by 83 days.

(21) Appl. No.: 13/721,844

(22) Filed: Dec. 20, 2012

(51) Int. Cl.
*G06F 17/30* (2006.01)

(52) U.S. Cl.
CPC .... *G06F 17/30117* (2013.01); *G06F 17/30138* (2013.01)

(58) Field of Classification Search
CPC ............... G06F 17/30117; G06F 17/30067
USPC .......................................................... 707/828
See application file for complete search history.

(56) References Cited

U.S. PATENT DOCUMENTS

| | | | |
|---|---|---|---|
| 7,631,155 B1 | 12/2009 | Bono et al. | |
| 7,694,191 B1 | 4/2010 | Bono et al. | |
| 7,818,535 B1 | 10/2010 | Bono et al. | |
| 7,873,619 B1 | 1/2011 | Faibish et al. | |
| 7,945,726 B2 | 5/2011 | Faibish et al. | |
| 8,037,345 B1 | 10/2011 | Iyer et al. | |
| 8,095,577 B1 | 1/2012 | Faibish et al. | |
| 8,204,871 B1 | 6/2012 | Pawar et al. | |
| 8,285,758 B1 | 10/2012 | Bono et al. | |
| 8,566,371 B1 | 10/2013 | Bono et al. | |
| 2003/0172094 A1* | 9/2003 | Lauria et al. | 707/206 |
| 2008/0005205 A1* | 1/2008 | Rajakarunanayake | 707/205 |
| 2009/0077327 A1* | 3/2009 | Hara | 711/154 |
| 2013/0218934 A1* | 8/2013 | Lin et al. | 707/828 |

* cited by examiner

*Primary Examiner* — James Trujillo
*Assistant Examiner* — Grace Park
(74) *Attorney, Agent, or Firm* — BainwoodHuang

(57) ABSTRACT

A technique manages filesystem blocks of a filesystem. The technique involves modifying an inode structure which identifies a filesystem directory, the directory's inode structure currently including a set of filesystem blocks which was allocated to the directory's inode structure to hold filesystem data. The technique further involves, after modifying the directory's inode structure, performing a directory check operation to determine whether the filesystem directory is empty. The technique further involves reclaiming, from the directory's inode structure, the set of filesystem blocks which was allocated to the directory's inode structure to hold the filesystem data when a result of the directory check operation indicates that the filesystem directory is empty, and not reclaiming the set of filesystem blocks from the directory's inode structure when the result of the directory check operation indicates that the filesystem directory is not empty.

22 Claims, 7 Drawing Sheets

RECLAIMING BLOCKS FROM A DIRECTORY

BACKGROUND

In some conventional computer systems, the operating system references files using inode structures. Examples of such files include ordinary files which store application data, and directories which store directory entries to represent files residing in the directories.

When the operating system creates a directory, the operating system allocates an inode structure to represent that directory. As files are placed in the directory, the operating system allocates blocks to the directory's inode structure to hold directory entries which map filenames of the files to the inode numbers of the files. As files are deleted from the directory, the operating system invalidates the directory entries corresponding to the deleted files, e.g., by replacing the inode numbers in those directory entries with zeroes. Examples of operating systems which operate in a manner similar to that described above include various versions of UNIX®.

SUMMARY

Unfortunately, there are deficiencies with the above-described conventional computer system in which the operating system simply invalidates directory entries (e.g., by replacing inode numbers with zeroes). In particular, the blocks which are allocated to the directory's inode structure to hold directory entries are never released back to the computer system even if the directory's inode structure no longer contains any valid directory entries. Rather, since the directory's inode structure retains the allocated blocks, the size of the directory's inode structure increases over time and performance in accessing directory entries is negatively affected. Moreover, as the size of directory's inode structure increases, the supply of available blocks within the computer system decreases.

In contrast to the above-described conventional computer systems which do not release blocks even if the directories no longer contain files, improved techniques involve automatically releasing filesystem blocks from a directory's inode structure back to an available pool of filesystem blocks when the number of valid directory entries in the directory's inode structure becomes zero, i.e., when the directory becomes empty. Such techniques may prevent the size of the directory's inode structure from always increasing, e.g., the directory's inode structure may be restored to its original size when the directory becomes empty. Accordingly, performance in accessing any new files which are subsequently added to that directory is improved. Furthermore, release of filesystem blocks back to the available pool of filesystem blocks replenishes the supply of free filesystem blocks for subsequent re-use.

It should be understood that the term "directory" refers to an inode structure that has been allocated and populated with information to identify that directory. It should be further understood that "a file in a directory" refers to a filesystem object (or abstraction) that is identified by a valid directory entry stored in a set of blocks which has been allocated to the inode structure identifying that directory. One will appreciate that the number of files in a directory and the number of valid directory entries stored in the set of blocks which has been allocated to the inode structure identifying that directory may be different (e.g., multiple links may identify the same file).

One embodiment is directed to a method of managing filesystem blocks of a filesystem. The method includes modifying an inode structure which identifies a filesystem directory, the directory's inode structure currently including a set of filesystem blocks which was allocated to the directory's inode structure to hold filesystem data. The method further includes, after modifying the directory's inode structure, performing a directory check operation to determine whether the filesystem directory is empty. The method further includes reclaiming, from the directory's inode structure, the set of filesystem blocks which was allocated to the directory's inode structure to hold the filesystem data when a result of the directory check operation indicates that the filesystem directory is empty, and not reclaiming the set of filesystem blocks from the directory's inode structure when the result of the directory check operation indicates that the filesystem directory is not empty.

In some arrangements, the directory's inode structure includes an entry count field which stores an entry count value identifying the number of valid directory entries currently residing in the directory (i.e., in the directory's inode structure). Removing a directory entry from a directory involves marking the specific directory entry in such a manner as to indicate that the specific directory entry is no longer valid, and updating the entry count field to store a new entry count value. Additionally, ascertaining whether the directory is empty involves reading the new entry count value from the entry count field and, based on the new entry count value, determining whether the number of valid directory entries currently residing in the directory is zero.

In some arrangements, reclaiming the set of filesystem blocks which was allocated to the directory's inode structure includes returning the set of filesystem blocks to the pool of free filesystem blocks. As a result, the returned filesystem blocks are available for re-allocation.

It should be understood that each inode structure includes a type of file field which stores a type indicator indicating a file type. In some arrangements, returning the set of filesystem blocks to the pool of free filesystem blocks for re-allocation includes (i) copying contents of the directory's inode structure to a new inode structure, (ii) overwriting, in a type of file field of the new inode structure, a copy of a directory type indicator with an ordinary type indicator to indicate that the new inode structure identifies an ordinary file, (iii) submitting the new inode structure to a cleanup routine which processes the new inode structure as if an ordinary file has been deleted from the filesystem to return the set of filesystem blocks to the pool of free filesystem blocks, and (iv) resetting fields in the directory's inode structure to a state that is equivalent to a newly allocated inode, i.e., an inline state.

Other embodiments are directed to electronic systems and apparatus, processing circuits, computer program products, and so on. Some embodiments are directed to various processes, electronic components and circuitry which are involved in reclaiming blocks from a directory.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves automatically releasing filesystem blocks from a directory's inode structure back to an available pool of filesystem blocks when the number of files in the directory becomes zero, i.e., when there are no valid directory entries in the directory's inode structure. Such a technique prevents the size of directory's inode structure from always increasing, e.g., the inode structure of the directory is restored to its original size when the directory becomes empty. As a result, performance in accessing new files which are subsequently added to a downsized directory is improved. Furthermore, release of filesystem blocks back to the available pool of filesystem blocks replenishes the supply of free filesystem blocks for subsequent re-use.

Figure 1:
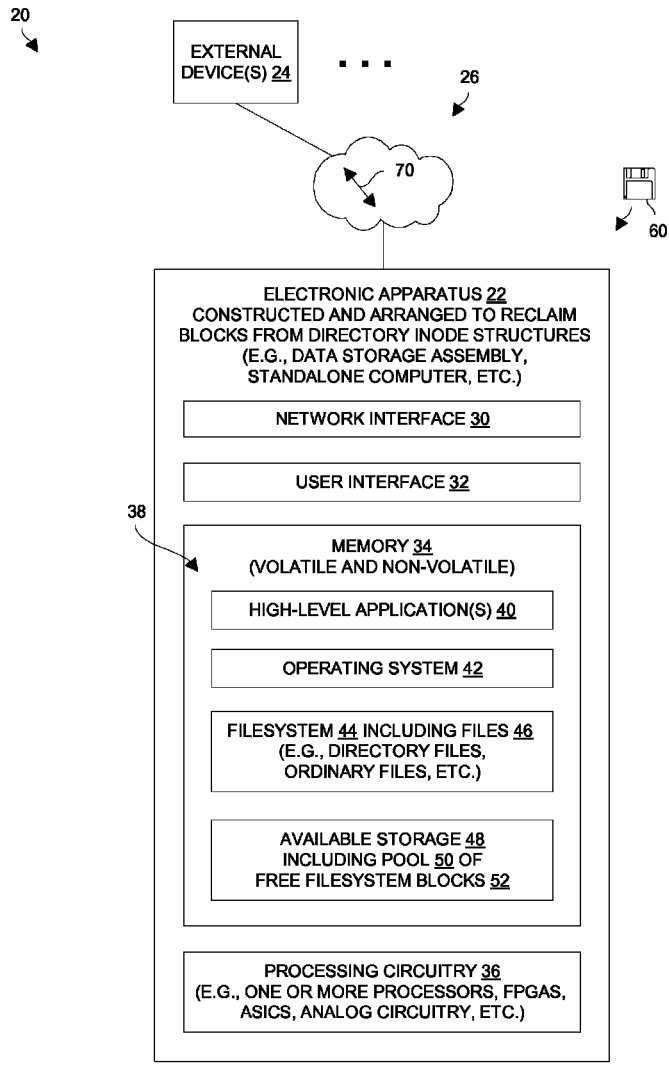
FIG. 1 is a block diagram of an electronic apparatus which reclaims blocks of a directory when the directory becomes empty.

FIG. 1 shows an electronic environment 20 which supports reclamation of blocks of a directory's inode structure when the directory becomes empty. The electronic environment 20 includes an electronic apparatus 22, external device(s) 24, and a communications medium 26.

The electronic apparatus 22 includes a network interface 30, a user interface 32, memory 34, and processing circuitry 36. The memory 34 stores a variety of memory constructs 38 including, among other things, a set of high-level applications 40, an operating system 42, a filesystem 44 having files 46, and available storage 48 having a pool 50 of free filesystem blocks (or extents) 52.

The network interface 30 is constructed and arranged to connect the electronic apparatus 22 to the communications medium 26. Accordingly, the network interface 30 enables the electronic apparatus 22 to communicate with the other components of the electronic environment 20 such as an external device 24.

The user interface 32 is constructed and arranged to receive input from a user and provide output to the user, i.e., user I/O. Examples of suitable user interface components include a keyboard, a mouse, a display, a touch display pad, a service processor, and so on.

The memory 34 includes both volatile memory (e.g., DRAM, SRAM, etc.) and non-volatile memory (e.g., flash storage units, magnetic disk drives, etc.). The high level applications 40 represent programs that store data within and retrieve data from the files 46 of the filesystem 44 (e.g., user level applications, client/server applications, etc.). The operating system 42 refers to a kernel, drivers, libraries, utilities and tools, and so on. The filesystem 44 refers to a hierarchically arranged set of files 46 (e.g., directories, ordinary files, associated metadata, etc.). The available storage 48 refers to unused memory including the pool 50 of free filesystem blocks 52.

The processing circuitry 36 is constructed and arranged to perform useful work while running in accordance with certain memory constructs 38 (e.g., the high level applications 40, the operating system 42, etc.). It should be understood that the processing circuitry 36 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on.

In the context of one or more processors running specialized software, a computer program product 60 is capable of delivering all or portions of the software to the electronic apparatus 22. The computer program product 60 has a non-transitory (or non-volatile) computer readable medium which stores a set of instructions which controls one or more operations of the electronic apparatus 22. Examples of suitable computer readable storage media include tangible articles of manufacture and apparatus which store instructions in a non-volatile manner such as CD-ROM, flash memory, disk memory, tape memory, and the like.

Based on the above-provided description of the electronic apparatus 22, it should be understood that the electronic apparatus 22 is well-provisioned to perform a variety of operations. For example, the electronic apparatus 22 may operate as a server such as a data storage server, a file server, a web server, a database server, and so on. Additionally, the electronic apparatus 22 may operate as a client such as a user workstation, a portable or mobile user device, a general purpose computer, a specialized computer, and so on.

It should be understood that, in the context of a data storage assembly or array, the non-volatile portion of the memory 34 may be tiered based on access speed. For example, the storage may include a first tier of flash memory, a second tier of SAS memory, and a third tier of near line SAS memory. Furthermore, in this context, one or more of the external device(s) 24 may be a host device which sends host IOs (e.g., SCSI read and write operations) to the electronic apparatus 22 for processing.

It should be further understood that the communications medium 26 connects the various components of the electronic environment 20 together to enable these components to exchange electronic signals 70 (e.g., see the double arrow 70). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

During operation, the electronic apparatus 22 maintains the filesystem 44 in the memory 34. In particular, the processing circuitry 36 while executing code of the operating system 42 may add, delete, and/or modify the files 46 of the filesystem 44. The files 46 may include directory files (or simply directories), ordinary (or regular) files, as well as other file types (e.g., special files, links, pipes, sockets, etc.). For example, the processing circuitry 36 may create a filesystem directory and place other files within that directory in response to user input, in response to instructions from an application 40, in response to commands from an external device 24, combinations thereof, and so on. The directory may form one node of a directory hierarchy (e.g., parent and child directories arranged in an inverted tree formation).

To create a directory, the processing circuitry 36 allocates an inode structure from an inode table, and configures the inode structure and perhaps other filesystem metadata (e.g., sets up ownership, permissions, location within the directory hierarchy, etc.). As other files 46 are placed within the directory, the processing circuitry 36 allocates filesystem blocks 52 from the pool 50 of free filesystem blocks 52 to hold directory entries corresponding to the other files 46, i.e., mappings of an inode number and a filename for each file 46 within that directory. Additionally, the processing circuitry 36 maintains a count of the number of valid directory entries in each directory. As will be explained in further detail shortly, the processing circuitry 36 monitors this count to automatically reclaim blocks 52 if the directory becomes empty, i.e., if the number of valid directory entries becomes zero. Further details will now be provided with reference to FIGS. 2 and 3.

Figure 2:
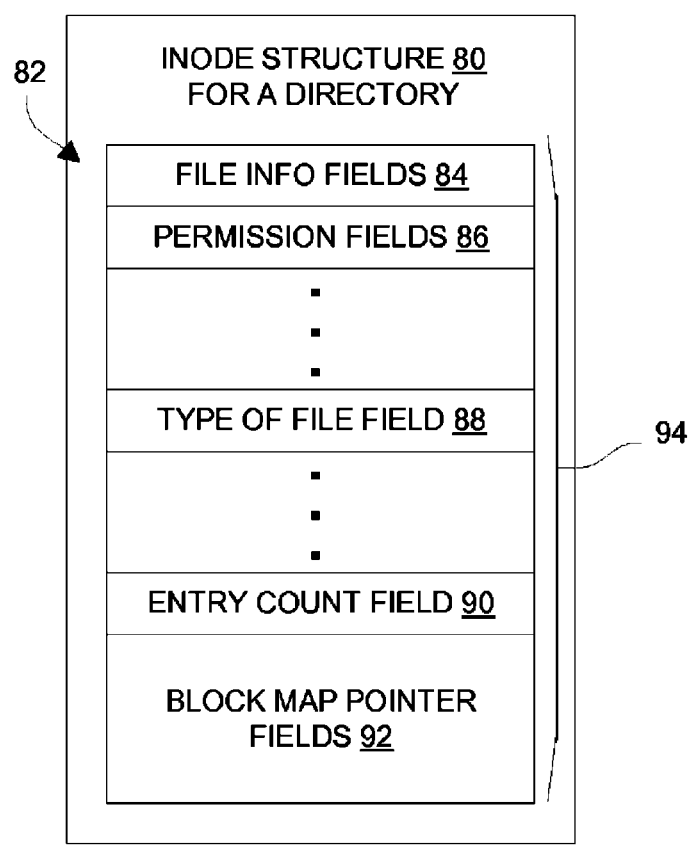
FIG. 2 is a block diagram of an inode structure managed by the electronic apparatus of FIG. 1 to identify a directory.
Figure 3:
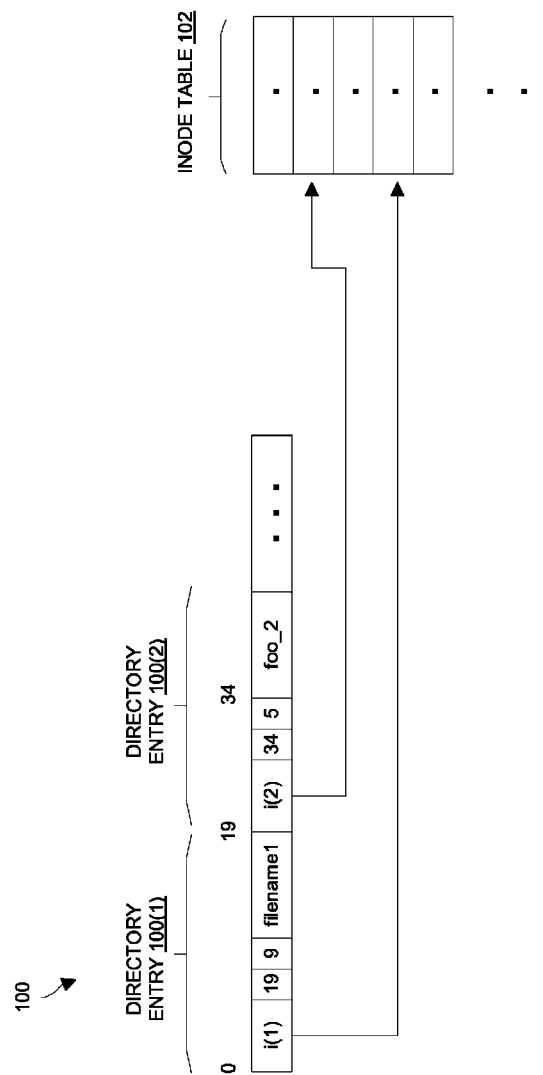
FIG. 3 is a block diagram of a portion of the directory's inode structure of FIG. 2 which identifies files residing in the directory.

FIGS. 2 and 3 show particular details of an inode structure 80 which identifies a directory. FIG. 2 shows a general view of an example format for the directory's inode structure 80. FIG. 3 shows a general view of an example set of directory entries which identify other files 46 residing in the directory.

With reference to FIG. 2, the directory's inode structure 80 includes a set of fields 82 which holds information about the directory. The set of fields 82 includes file info fields 84, permission fields 86, a type of file field 88, an entry count field 90, and block map pointer fields 92, among others. The contents of the file info fields 84 indicate certain items of information about the file 46 such as the size of the file 46, the device ID, and so on. The contents of the permission fields 86 indicate permission attributes of the file 46 such as the user ID, the group ID, access permissions, etc. The contents of the type of file field 88 indicate the file type (or mode) which, in this case, indicates that the file 46 is a directory. The contents of the entry count field 90 indicate the number of valid directory entries that currently reside within the directory. The contents of the block map pointer fields 92 are pointers which identify directly or indirectly allocated blocks that contain mappings corresponding to the other files 46 that reside within the directory (i.e., valid directory entries that the filesystem uses to lookup and access other files 46).

It should be understood that the directory's inode structure 80 may include other fields to store other attributes as well. Such attributes may include the number of links, the time of last access, the time of last modification, and so on.

It should be further understood that not all of the fields 82 are initially required by the directory's inode structure 80. For example, bracket 94 identifies a main portion of the directory's inode structure 80 having particular fields 82 which are suitable for use upon initial creation of the directory, i.e., when the directory is in an "inline" state. Later, as files 46 are incrementally added to the directory, the processing circuitry 36 allocates blocks 52 from the pool 50 of free filesystem blocks 52 to hold directory entries identifying the added files 46, and updates the block map to identify these allocated blocks 52.

As shown in FIG. 3, each directory entry 100 identifies an inode of inode table 102. In particular, the directory entry 100(1) maps a filename "filename1" to inode i(1) of the inode table 102. Similarly, the directory entry 100(2) maps a filename "foo_2" to inode i(2) of the inode table 102, and so on.

As mentioned earlier, as files 46 are added to the directory, the processing circuitry 36 allocates blocks 52 from the pool 50 of free filesystem blocks 52 (FIG. 1) to the directory's inode structure 80 (FIG. 2) to enable the directory's inode structure 80 to store the directory entries 100 for the added files 46. As will now be explained with reference to an example and FIGS. 4-6, the processing circuitry 36 routinely performs a directory check operation to determine whether the number valid directory entries 100 in the directory has fallen back to zero and, if so, reclaims blocks 52 from the directory's inode structure 80.

Figure 4:
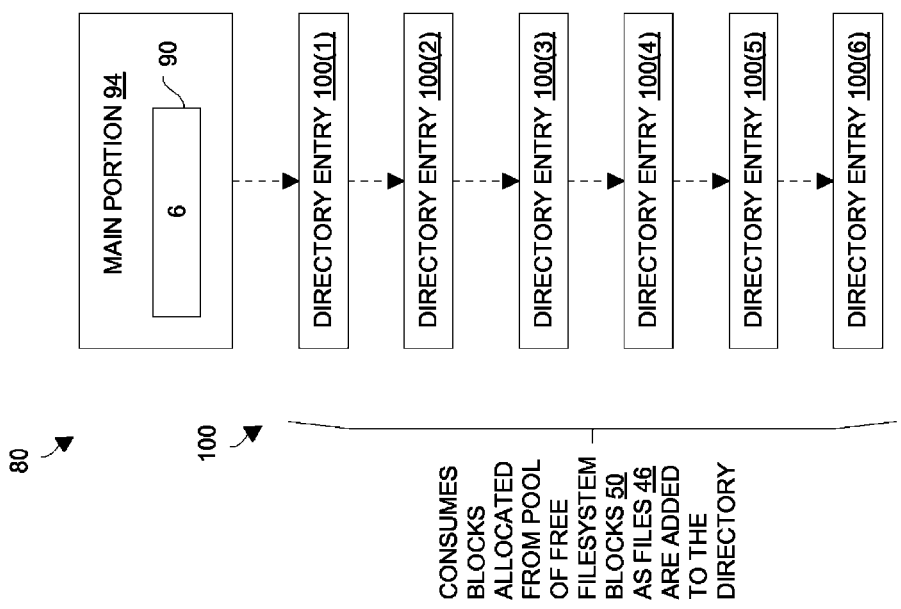
FIG. 4 is a block diagram of an example directory's inode structure managed by the electronic apparatus of FIG. 1 at a particular time of operation.
Figure 5:
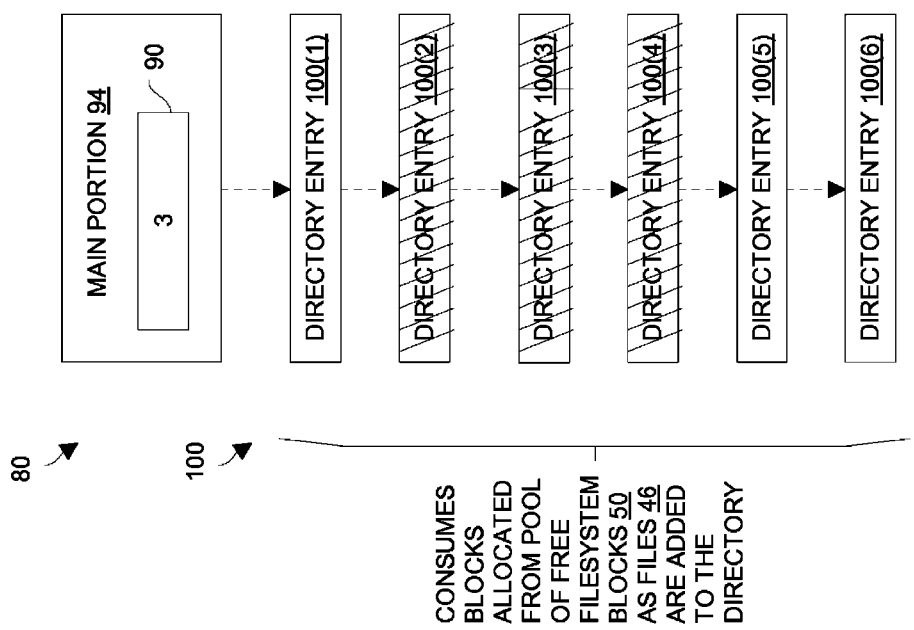
FIG. 5 is a block diagram of the example directory's inode structure managed by the electronic apparatus of FIG. 1 at another time of operation.
Figure 6:
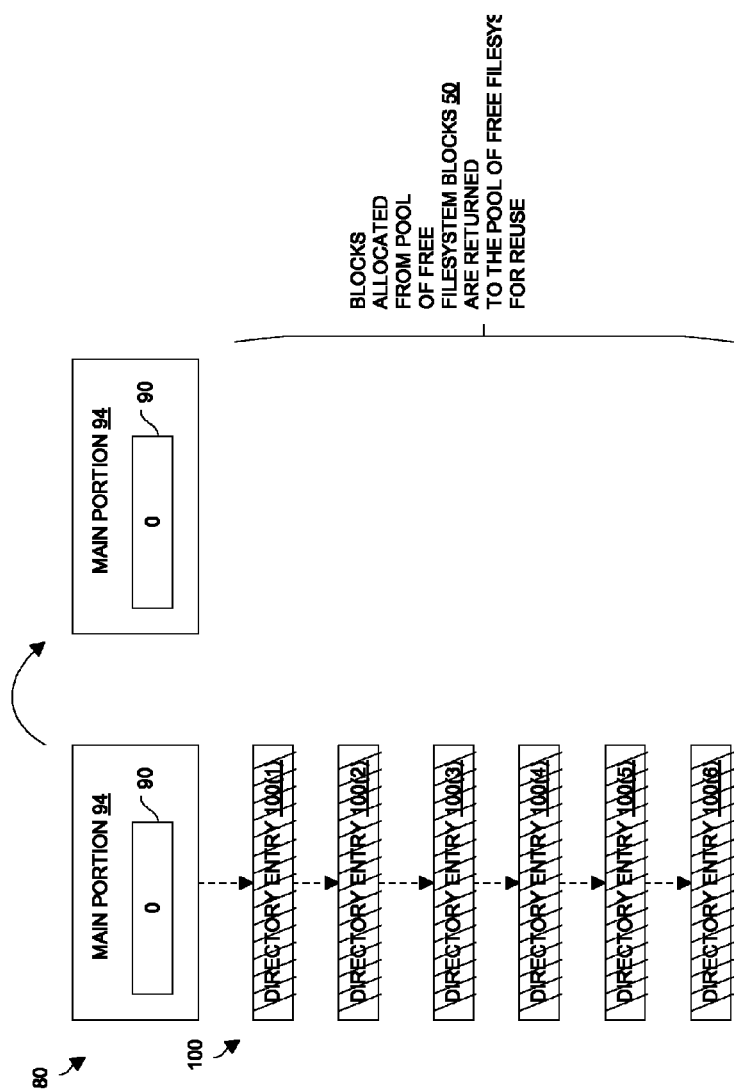
FIG. 6 is a block diagram of the example directory's inode structure managed by the electronic apparatus of FIG. 1 at yet another time of operation.

FIGS. 4-6 show, by way of example, a directory's inode structure 80 at different times of use. In particular, FIG. 4 shows an example directory's inode structure 80 shortly after the directory has been created and valid directory entries 100 have been added to the directory (e.g., at time T(1)). FIG. 5 shows the example directory's inode structure 80 at a subsequent time when a few of the directory entries 100 have been removed from the directory (e.g., at time T(2)), i.e., some of the directory entries 100 have been invalidated. FIG. 6 shows a process of truncating the example directory's inode structure 80 when the remaining valid directory entries 100 have been removed from the directory (e.g., at time T(3)).

FIG. 4 shows the example directory's inode structure 80 after the processing circuitry 36 has added directory entries 100 to the example directory. Such addition may have occurred incrementally over a period of use. As shown in FIG. 4, the example directory's inode structure 80 now includes six valid directory entries 100(1), . . . 100(6). Additionally, the entry count field 90 stores a value of 6 to indicate that the directory currently holds six valid directory entries 100.

It should be understood that the particular storage that holds the directory entries 100 was allocated from the pool 50 of free filesystem blocks 52 by the processing circuitry 36 as the directory entries 100 were added to the directory (also see FIG. 1). Along these lines, the pointer fields 92 of the directory's inode structure 80 contain pointers to these blocks 52 in a traditional manner. Some of the allocated blocks 52 may contain other pointers (e.g., singly indirect pointers, doubly indirect pointers, etc.) to other allocated blocks 52 containing the directory entries 100.

It should be further understood that the processing circuitry 36 routinely performs a directory check operation to determine whether the directory is empty. Such a directory check operation may be performed each time a directory entry is removed from the directory. If the processing circuitry 36 determines that the number of valid directory entries 100 currently in the directory is zero, the processing circuitry 36 reclaims the blocks 52 that were earlier allocated to hold the directory entries 100.

After some additional time of operation, suppose that the processing circuitry 36 has removed three valid directory entries 100 from the directory, namely, the directory entries 100(2), 100(3) and 100(4). In this situation and as shown in FIG. 5, the processing circuitry 36 has invalidated the directory entries 100(2), 100(3) and 100(4). One suitable technique for marking a directory entry 100 as invalid is to replace the inode number in that directory entry 100 with zeroes.

Additionally, when the processing circuitry 36 marks a directory entry 100 invalid, the processing circuitry 36 updates the contents of the entry count field 90. As shown in FIG. 5, the processing circuitry 36 has set the contents of the entry count field 90 to a value of 3 to indicate that the directory currently holds three valid directory entries 46.

As mentioned earlier, each time a valid directory entry 100 is removed from the directory, the processing circuitry 36 performs a directory check operation to determine whether the directory is empty. In particular, the processing circuitry 36 evaluates the value in the entry count field 90 to ascertain whether the value indicates that there are no valid directory entries 100 left in the directory. In this situation shown in FIG. 5, there is still at least one valid directory entry 100 in the directory (i.e., there are 3 valid directory entries 100 left in the directory) so the directory is not empty.

Additionally (still with reference to the situation in FIG. 5), the storage that was allocated to the directory's inode structure 80 is still consumed by the directory's inode structure 80. However, within the allocated storage, only the directory entries 100(1), 100(5) and 100(6) validly identify other files 46. That is, the directory entries 100(2), 100(3) and 100(4) are simply marked as invalid but still consume filesystem blocks 52 (illustrated by the strikethrough lines in FIG. 5). In some arrangements, invalidation of a directory entry 100 involves the processing circuitry 36 overwriting the inode number of that directory entry 100 with zeroes (also see FIG. 3).

It should be understood that files 46 could be added to the directory after some files 46 have been deleted. In such a situation, the processing circuitry 36 may allocate additional blocks 52 from the pool 50 of free filesystem blocks 52 to the directory's inode structure 80 to hold additional directory entries 100 identifying the added files 46 (e.g., to append new directory entries 100 to the directory entry 100(6)), and update the value of the entry count field 90. The term "may allocate" is used since some systems attempt to add directory entries to the first available unoccupied entry in the directory structure. If the attempt fails (e.g., if there is not enough space available to fit the entry because the filename is too large to occupy the any of the unoccupied entries), additional blocks 52 from the pool 50 of free filesystem blocks 52 are allocated to the directory's inode structure 80.

After some further time of operation, suppose that the processing circuitry 36 finally removes the remaining valid directory entries 100 from the directory. At this point, the processing circuitry 36 performs a directory check operation and determines that the directory is now empty. In response, the processing circuitry 36 performs a block reclamation operation to return the blocks 52 allocated to hold the directory entries 100 back to the pool 50 of free file system blocks 52 (FIG. 1).

In particular and as shown on the left side of FIG. 6, the processing circuitry 36 invalidates the last directory entry 46 and changes the value in the entry count field 90 to indicate the number of valid directory entries 100 in the directory is zero when the last. Then, the processing circuitry 36 performs the directory check operation and determines that the directory is now empty. In response to such detection, the processing circuitry 36 automatically performs a reclamation operation to reclaim the blocks 52 that were earlier allocated to hold the directory entries 100 leaving a truncated directory inode structure 80 as shown on the right side of FIG. 6, i.e., the main portion 94 (also see FIG. 2). Along these lines, the processing circuitry 36 returns the earlier allocated blocks 52 back to the pool 50 of free filesystem blocks 52, and restores the directory's inode structure 80 to its initial inline condition.

At this point, the returned filesystem blocks 52 are again available for allocation. Furthermore, if new directory entries 100 are later added to the directory, the processing circuitry 36 will allocate blocks 52 from the pool 50 of free filesystem blocks 52 and performance in accessing the directory's inode structure 80 will be improved (e.g., less overhead traversing the directory's inode structure 80).

In some arrangements, the processing circuitry 36 leverages off of an existing cleanup utility that reclaims blocks 52 from ordinary files 46 when the ordinary files are deleted. The cleanup utility may be formed by the processing circuitry 36 executing certain cleanup code of the operating system 46 (FIG. 1). To reclaim blocks 52 using the cleanup utility, the processing circuitry 36 allocates a new inode structure and copies the contents of the main portion 94 of the directory's inode structure 80 to the new inode structure (FIG. 2). Here, the new inode structure 80 identifies the same block map used by the original directory inode structure 80 and thus identifies all of the allocated blocks 52 used as indirect blocks and used to hold the directory entries 100.

Next, the processing circuitry 36 overwrites, in a type of file field of the new inode structure, a copy of the directory type indicator with an ordinary type indicator to indicate that the new inode structure identifies an ordinary file rather than a directory. That is, the type of file field 88 (also see FIG. 2) of the directory's inode structure 80 initially has a value which indicates that the file 46 is a directory. Here, the processing circuitry 36 changes the value of the type of file field in the new inode structure to indicate an ordinary file. Essentially, the processing circuitry 36 modifies the type field 88 to spoof the cleanup utility into processing the copy of the directory's inode structure as an ordinary deleted file.

Then, the processing circuitry 36 submits the new inode structure to the cleanup routine which processes the new inode structure as if an ordinary file has been deleted to return the set of filesystem blocks to the pool 50 of free filesystem blocks. Along these lines, the cleanup utility is able to identify and de-allocate the blocks 52 based on the pointers as if the new inode structure was an ordinary file. The processing circuitry 36 then de-allocates the new inode structure as well. Further details will now be provided with reference to FIG. 7.

Figure 7:
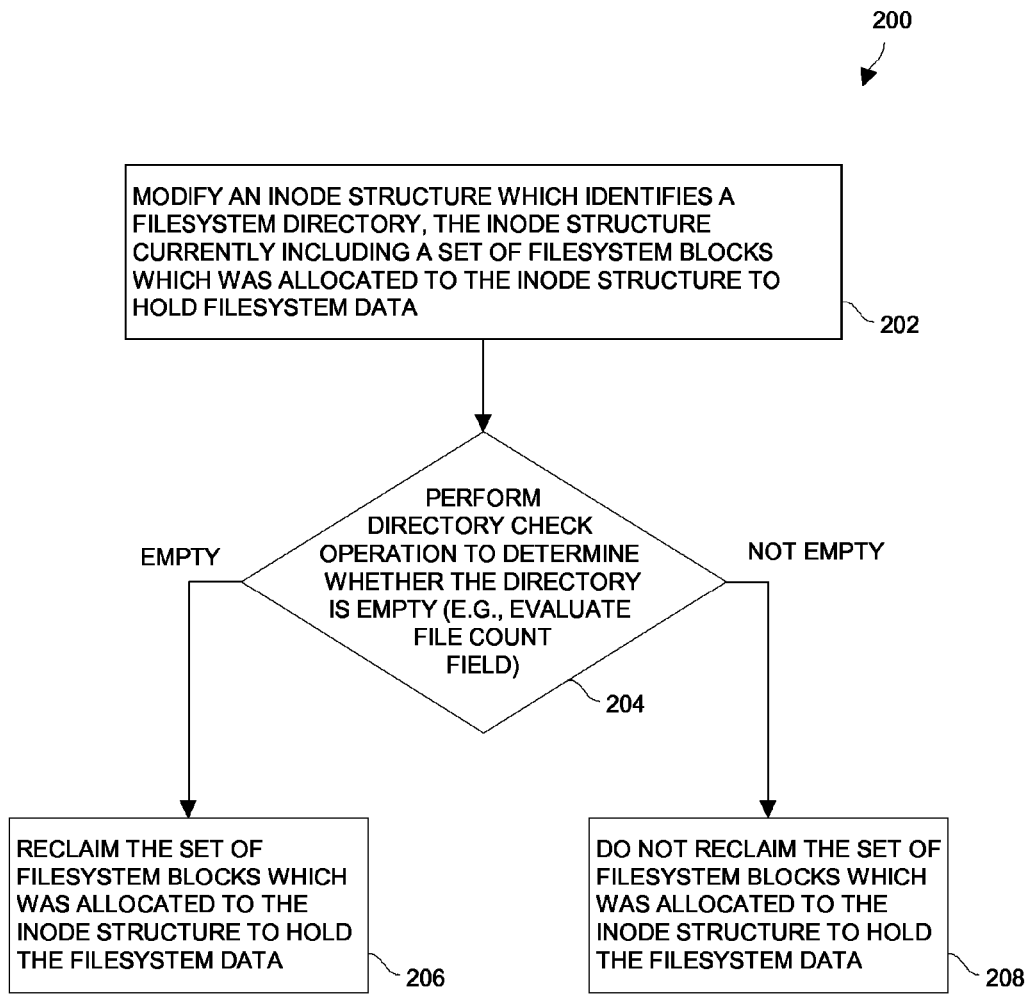
FIG. 7 is a flowchart of a procedure which is performed by the electronic apparatus of FIG. 1 to reclaim blocks of a directory when the directory becomes empty.

FIG. 7 is a flowchart of a procedure 200 which is performed by the electronic apparatus 22 to reclaim blocks 52 of an inode structure 80 for a directory when the directory becomes empty. At 202, the processing circuitry 36 of the electronic apparatus 22 modifies a directory's inode structure 80 which identifies a filesystem directory. After the modification is made, the directory's inode structure 80 includes a set of filesystem blocks 52 which was allocated to the directory's inode structure 80 to hold filesystem data (also see FIG. 4).

At 204, after modifying the directory's inode structure 80, the processing circuitry 36 performs a directory check operation to determine whether the directory is empty. In particular, the processing circuitry 36 evaluates the contents of the entry count field 90 and considers the directory to be empty when the represented value is zero. Otherwise, the directory is considered not empty. If the directory is empty, 204 proceeds to 206. If the directory is not empty, 204 proceeds to 208.

At 206, the processing circuitry 36 reclaims, from the directory's inode structure 80, the set of filesystem blocks 52 which was allocated to the directory's inode structure 80 to hold the filesystem data. Here, since the result of the directory check operation indicated that the filesystem directory is empty, the set of filesystem blocks 52 are returned to the pool 50 of free filesystem blocks 52 for reuse (also see FIGS. 1 and 6).

At 208, the processing circuitry 36 does not reclaim the set of filesystem blocks 52 from the directory's inode structure 80. That is, the result of the directory check operation indicated that the filesystem directory is not empty (also see FIGS. 3 and 4).

As mentioned above, improved techniques involve automatically releasing filesystem blocks 52 from a directory's inode structure 80 back to an available pool 50 of filesystem blocks 52 when the number valid directory entries 100 in the directory becomes zero. Such techniques may prevent the size of the directory's inode structure 80 from always increasing, e.g., the inode structure 80 may be restored to its original size when the directory becomes empty. Accordingly, performance in accessing new files 46 which are subsequently added to that directory is improved. Furthermore, release of filesystem blocks 52 back to the available pool 50 of filesystem blocks 52 replenishes the supply of free filesystem blocks for subsequent re-use.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the directory check operation was described above as being performed after a file is removed from a directory by way of example only. In other arrangements, a daemon runs in the background to periodically inspect directories and reclaim blocks 52 from any directories that are empty. In yet other arrangements, the directory check operation is performed after any type of directory access operation (not just a file deletion).

Additionally, it should be understood that the use of the entry count field 90 was described above as a way of tracking the number valid directory entries 100 in a directory. It should be understood that other techniques are suitable as well. For example, if performance is not an issue, the processing circuitry 36 can scan the directory entries 100 of the directory's inode structure 80 for valid directory entries 100 and, as long as there is at least one valid directory entry 100 in the directory's inode structure 80, the processing circuitry 36 refrains from reclaiming blocks. However, if there processing circuitry 36 determines that there are no valid directory entries 100 after the scan is complete, the processing circuitry 36 considers the directory empty and reclaims blocks. Such modifications and enhancements are intended to belong to various embodiments of this disclosure.

What is claimed is:

1. A method of managing filesystem blocks of a filesystem, the method comprising:
   modifying an inode structure which identifies a filesystem directory, the inode structure currently including a set of filesystem blocks which was allocated to the inode structure to hold filesystem data;
   after modifying the inode structure, performing a directory check operation to determine whether the filesystem directory is empty; and
   reclaiming, from the inode structure, the set of filesystem blocks which was allocated to the inode structure to hold the filesystem data when a result of the directory check operation indicates that the filesystem directory is empty, and not reclaiming the set of filesystem blocks from the inode structure when the result of the directory check operation indicates that the filesystem directory is not empty;
   wherein the inode structure includes a type of file field which stores a directory type indicator indicating that the inode structure identifies a filesystem directory; and
   wherein reclaiming the set of filesystem blocks includes:
   copying contents of the inode structure to a new inode structure,
   overwriting, in a type of file field of the new inode structure, a copy of the directory type indicator with an ordinary type indicator to indicate that the new inode structure identifies an ordinary file, and
   submitting the new inode structure to a cleanup routine which processes the new inode structure as if an ordinary file has been deleted from the filesystem to return the set of filesystem blocks allocated to the inode structure to a pool of free filesystem blocks.

2. A method as in claim 1, further comprising:
   prior to modifying the inode structure, allocating the set of filesystem blocks to the inode structure from the pool of free filesystem blocks and storing, as the filesystem data, a set of directory entries in the set of filesystem blocks, the set of directory entries identifying a set of files residing in the filesystem directory.

3. A method as in claim 2 wherein modifying the inode structure includes:
   marking a directory entry of the set of directory entries to indicate that a file of the set of files no longer resides in the filesystem directory.

4. A method as in claim 3 wherein performing the directory check operation to determine whether the filesystem directory is empty includes:
   ascertaining whether any files continue to reside in the filesystem directory, the filesystem directory being empty when no files currently reside in the filesystem directory, and the filesystem directory not being empty when at least one file currently resides in the filesystem directory.

5. A method as in claim 4 wherein the inode structure further includes an entry count field which stores an entry count value to identify the number of valid directory entries currently residing in the set of filesystem blocks allocated to the inode structure; and wherein modifying the inode structure further includes:
   when marking the directory entry to indicate that the file no longer resides in the filesystem directory, updating the entry count field to store a new entry count value.

6. A method as in claim 5 wherein ascertaining whether any files continue to reside in the filesystem directory includes:
   reading the new entry count value from the entry count field of the inode structure and, based on the new entry count value, determining whether the number of files currently residing in the filesystem directory is zero.

7. A method as in claim 4 wherein reclaiming the set of filesystem blocks which was allocated to the inode structure includes:
   returning the set of filesystem blocks to the pool of free filesystem blocks for re-allocation.

8. A method as in claim 7, further comprising:
   when reclaiming the set of filesystem blocks which was allocated to the inode structure, truncating the inode structure to return the inode structure to an initial inline state.

9. A method as in claim 7 wherein the inode structure further includes an entry count field which stores an entry count value to identify the number of valid directory entries currently residing in the set of filesystem blocks allocated to the inode structure; and wherein the method further comprises:
   changing the entry count value of the inode structure in response to changing the number of files currently residing in the filesystem directory.

10. A method as in claim 1 wherein modifying the inode structure includes invalidating a directory entry of the inode structure, the directory entry having previously stored an inode number identifying a file (i) which resided in the filesystem directory identified by the inode structure and (ii) which now has been deleted from the filesystem directory; and
   wherein performing the directory check operation to determine whether the filesystem directory is empty includes discovering whether the number of files in the filesystem directory is zero while the inode structure continues to identify the filesystem directory, the filesystem directory being ready to hold a file.

11. A computer program product having a non-transitory computer readable medium which stores a set of instructions to manage filesystem blocks of a filesystem, the set of instructions, when carried out by computerized circuitry, causing the computerized circuitry to perform a method of:
  modifying an inode structure which identifies a filesystem directory, the inode structure currently including a set of filesystem blocks which was allocated to the inode structure to hold filesystem data;
  after modifying the inode structure, performing a directory check operation to determine whether the filesystem directory is empty; and
  reclaiming, from the inode structure, the set of filesystem blocks which was allocated to the inode structure to hold the filesystem data when a result of the directory check operation indicates that the filesystem directory is empty, and not reclaiming the set of filesystem blocks from the inode structure when the result of the directory check operation indicates that the filesystem directory is not empty;
  wherein the inode structure includes a type of file field which stores a directory type indicator indicating that the inode structure identifies a filesystem directory; and
  wherein reclaiming the set of filesystem blocks includes:
  copying contents of the inode structure to a new inode structure,
  overwriting, in a type of file field of the new inode structure, a copy of the directory type indicator with an ordinary type indicator to indicate that the new inode structure identifies an ordinary file, and
  submitting the new inode structure to a cleanup routine which processes the new inode structure as if an ordinary file has been deleted from the filesystem to return the set of filesystem blocks allocated to the inode structure to a pool of free filesystem blocks.

12. A computer program product as in claim 11 wherein the method further comprises:
  prior to modifying the inode structure, allocating the set of filesystem blocks to the inode structure from the pool of free filesystem blocks and storing, as the filesystem data, a set of directory entries in the set of filesystem blocks, the set of directory entries identifying a set of files residing in the filesystem directory.

13. A computer program product as in claim 12 wherein modifying the inode structure includes:
  marking a directory entry of the set of directory entries to indicate that a file of the set of files no longer resides in the filesystem directory.

14. A computer program product as in claim 13 wherein performing the directory check operation to determine whether the filesystem directory is empty includes:
  ascertaining whether any files continue to reside in the filesystem directory, the filesystem directory being empty when no files currently reside in the filesystem directory, and the filesystem directory not being empty when at least one file currently resides in the filesystem directory.

15. A computer program product as in claim 14 wherein the inode structure further includes an entry count field which stores an entry count value to identify the number of valid directory entries currently residing in the set of filesystem blocks allocated to the inode structure; and wherein modifying the inode structure further includes:
  when marking the directory entry to indicate that the file no longer resides in the filesystem directory, updating the entry count field to store a new entry count value.

16. A computer program product as in claim 15 wherein ascertaining whether any files continue to reside in the filesystem directory includes:
  reading the new entry count value from the entry count field of the inode structure and, based on the new entry count value, determining whether the number of files currently residing in the filesystem directory is zero.

17. A computer program product as in claim 14 wherein reclaiming the set of filesystem blocks which was allocated to the inode structure includes:
  returning the set of filesystem blocks to the pool of free filesystem blocks for re-allocation.

18. A computer program product as in claim 11 wherein modifying the inode structure includes invalidating a directory entry of the inode structure, the directory entry having previously stored an inode number identifying a file (i) which resided in the filesystem directory identified by the inode structure and (ii) which now has been deleted from the filesystem directory; and
  wherein performing the directory check operation to determine whether the filesystem directory is empty includes discovering whether the number of files in the filesystem directory is zero while the inode structure continues to identify the filesystem directory, the filesystem directory being ready to hold a file.

19. An electronic apparatus, comprising:
  memory; and
  control circuitry coupled to the memory, the memory storing instructions which, when carried out by the control circuitry, cause the control circuitry to:
  modify an inode structure which identifies a filesystem directory, the inode structure including a set of filesystem blocks which was allocated to the inode structure to hold filesystem data following modification,
  after modifying the inode structure, perform a directory check operation to determine whether the filesystem directory is empty, and
  reclaim, from the inode structure, the set of filesystem blocks which was allocated to the inode structure to hold the filesystem data when a result of the directory check operation indicates that the filesystem directory is empty, and not reclaim the set of filesystem blocks from the inode structure when the result of the directory check operation indicates that the filesystem directory is not empty;
  wherein the inode structure includes a type of file field which stores a directory type indicator indicating that the inode structure identifies a filesystem directory; and
  wherein the control circuitry, when reclaiming the set of filesystem blocks, is constructed and arranged to:
  copying contents of the inode structure to a new inode structure,
  overwriting, in a type of file field of the new inode structure, a copy of the directory type indicator with an ordinary type indicator to indicate that the new inode structure identifies an ordinary file, and
  submitting the new inode structure to a cleanup routine which processes the new inode structure as if an ordinary file has been deleted from the filesystem to return the set of filesystem blocks allocated to the inode structure to a pool of free filesystem blocks.

20. An electronic apparatus as in claim 19 wherein the instructions which, when carried out by the control circuitry, further cause the control circuitry to:

prior to modifying the inode structure, allocate the set of filesystem blocks to the inode structure from the pool of free filesystem blocks and storing, as the filesystem data, a set of directory entries in the set of filesystem blocks, the set of directory entries identifying a set of files residing in the filesystem directory;

wherein modifying the inode structure includes marking a directory entry of the set of directory entries to indicate that a file of the set of files no longer resides in the filesystem directory; and wherein performing the directory check operation to determine whether the filesystem directory is empty includes ascertaining whether any files continue to reside in the filesystem directory, the filesystem directory being empty when no files currently reside in the filesystem directory, and the filesystem directory not being empty when at least one file currently resides in the filesystem directory.

21. An electronic apparatus as in claim 19 wherein the control circuitry, when modifying the inode structure, is constructed and arranged to invalidate a directory entry of the inode structure, the directory entry having previously stored an inode number identifying a file (i) which resided in the filesystem directory identified by the inode structure and (ii) which now has been deleted from the filesystem directory; and wherein the control circuitry, when performing the directory check operation to determine whether the filesystem directory is empty, is constructed and arranged to discover whether the number of files in the filesystem directory is zero while the inode structure continues to identify the filesystem directory, the filesystem directory being ready to hold a file.

22. An electronic apparatus as in claim 19 wherein the control circuitry, when performing the directory check operation to determine whether the filesystem directory is empty, is constructed and arranged to:

ascertain whether any files continue to reside in the filesystem directory, the filesystem directory being empty when no files currently reside in the filesystem directory, and the filesystem directory not being empty when at least one file currently resides in the filesystem directory.

\* \* \* \* \*